United States Patent
Zhang et al.

(10) Patent No.: US 12,197,095 B2
(45) Date of Patent: Jan. 14, 2025

(54) LIQUID CRYSTAL COMPOSITION AND DIMMING DEVICE THEREOF

(71) Applicant: Smart Liquid Crystal Technologies Co., Ltd., Suzhou (CN)

(72) Inventors: Hongwei Zhang, Suzhou (CN); Wenqing Shen, Suzhou (CN); Jianhua Tang, Suzhou (CN); Li Zhang, Suzhou (CN)

(73) Assignee: Smart Liquid Crystal Technologies Co., Ltd., Suzhou (CN)

( * ) Notice: Subject to any disclaimer, the term of this patent is extended or adjusted under 35 U.S.C. 154(b) by 44 days.

(21) Appl. No.: 17/927,953

(22) PCT Filed: Jan. 21, 2021

(86) PCT No.: PCT/CN2021/073067
§ 371 (c)(1),
(2) Date: Nov. 28, 2022

(87) PCT Pub. No.: WO2021/238244
PCT Pub. Date: Dec. 2, 2021

(65) Prior Publication Data
US 2023/0205030 A1    Jun. 29, 2023

(30) Foreign Application Priority Data
May 29, 2020   (CN) .......................... 202010473995.9

(51) Int. Cl.
| G02F 1/1333 | (2006.01) |
| C09K 19/14 | (2006.01) |
| C09K 19/20 | (2006.01) |
| C09K 19/54 | (2006.01) |
| C09K 19/60 | (2006.01) |
| G02F 1/137 | (2006.01) |

(52) U.S. Cl.
CPC .......... *G02F 1/13712* (2021.01); *C09K 19/14* (2013.01); *C09K 19/20* (2013.01); *C09K 19/54* (2013.01); *C09K 19/60* (2013.01); *G02F 2202/04* (2013.01); *G02F 2203/48* (2013.01)

(58) Field of Classification Search
CPC ........ C09K 19/14; C09K 19/20; C09K 19/54; C09K 19/60; C09K 19/3003; C09K 2019/0444; C09K 2019/3025; G02F 1/1333; G02F 1/13712; G02F 1/137
See application file for complete search history.

(56) References Cited

U.S. PATENT DOCUMENTS

| 2015/0175886 A1 | 6/2015 | Tuffin et al. |
| 2016/0298031 A1 | 10/2016 | Tuffin et al. |
| 2017/0190971 A1 | 7/2017 | Parri et al. |
| 2017/0343847 A1 | 11/2017 | Fiebranz et al. |
| 2023/0205030 A1* | 6/2023 | Zhang ................. G02F 1/13712 349/33 |

FOREIGN PATENT DOCUMENTS

| CN | 104321410 A | 1/2015 |
| CN | 105745307 A | 7/2016 |
| CN | 106536678 A | 3/2017 |
| CN | 107075370 A | 8/2017 |
| CN | 108663866 A | 10/2018 |
| GB | 2356629 A | 5/2001 |
| WO | WO-2019179962 A1 * | 9/2019 ............. C09K 19/04 |

* cited by examiner

*Primary Examiner* — Geraldina Visconti
(74) *Attorney, Agent, or Firm* — Hoffmann & Baron, LLP

(57) ABSTRACT

A liquid crystal composition includes a component A composed of one or more liquid crystals with negative dielectric anisotropy and a component B composed of one or more compounds selected from a general formula I, where the optical anisotropy of the liquid crystal composition is larger than 0.14. The elastic coefficient of a liquid crystal system is adjusted by introducing a bi-mesogenic compound into a negative liquid crystal or a negative liquid crystal mixture. When the liquid crystal composition is used for the dimming device, the minimum light transmittance of the dimming device in the dark state can be significantly reduced, the adjustment range of the light transmittance in the light state and the dark state can be expanded, and the haze in the dark state can be increased, thereby broadening the use range.

$$R_1\text{-}MG_1\text{-}X\text{-}MG_2\text{-}R_2 \qquad I$$

11 Claims, 1 Drawing Sheet

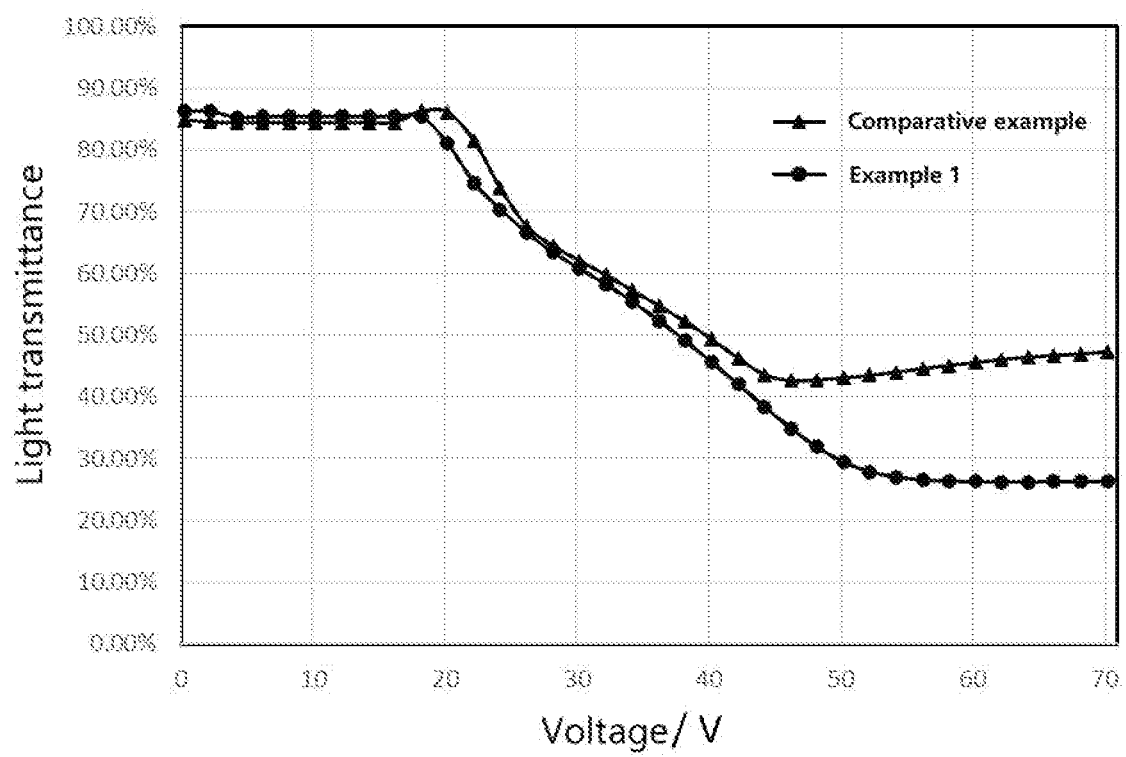

LIQUID CRYSTAL COMPOSITION AND DIMMING DEVICE THEREOF

CROSS-REFERENCE TO RELATED APPLICATIONS

This application is the National Stage of International Application No. PCT/CN2021/073067, filed Jan. 21, 2021, which claims the benefit of Chinese Application No. 202010473995.9 (CN), filed May 29, 2020, the contents of which is incorporated by reference herein.

TECHNICAL FIELD

The present invention relates to liquid crystal materials and electro-optic devices, and more particularly, to a negative liquid crystal composition and a light modulating device comprising the negative liquid crystal composition.

BACKGROUND OF THE INVENTION

A negative liquid crystal refers to a liquid crystal material whose perpendicular dielectric constant is greater than the parallel dielectric constant, and the liquid crystal molecules are driven to a state that is perpendicular to the electric field when an electric field is applied. When used in an electro-optic device, the negative liquid crystal has a higher light transmittance than the positive liquid crystal, and consequently, it has certain advantages and therefore widely used in liquid crystal displays. It is particularly suitable for light modulating products that need to be in transparent state most of the time and require dark state only when needed, which is a normally transparent device. It is more energy-saving compared with the normally dark mode where the device is transparent state when a voltage is applied and dark state when no voltage is applied. Although there are many reports about negative liquid crystal compositions and light modulating device using the same, there exists common problems, such as narrow light transmittance modulation range between the transparent and dark states, no privacy protection, only capable of adjusting tuning transmittance and the like. For example, patent CN108663866A discloses a light modulating device using guest-host liquid crystal composition, and the liquid crystal composition is a dichroic dye doped negative liquid crystal mixture that it can serve as a light modulation layer to regulate the transmittance by applying a voltage to the liquid crystal molecules, but the light transmittance tuning range between the transparent and dark states is only about 30%.

Bimesogenic compounds refer to liquid crystal compounds containing two mesogenic groups. Due to their special structure, they can adjust the elastic constant in a nematic liquid crystal mixture, which changes the uniformity of the molecular plane arrangement of the liquid crystal composition and reducing the texture defects.

Therefore, there remains a need for a liquid crystal composition, which allows the light modulating device to increase the light transmittance tuning range between the transparent and dark states while adding certain light scattering functions of the dark state.

SUMMARY OF THE INVENTION

Objects: In view of the deficiencies in the prior art, it is an object of the present invention to provide a liquid crystal composition, which allows the light modulating device to increase the light transmittance tuning range between the transparent and dark states while adding certain light scattering functions of the dark state. Another object of the present invention is to provide a light modulating device using the same.

In order to overcome the above issues, one objective of the present invention is to provide a liquid crystal composition used in light modulating devices, comprising:
Component A consists of one or more negative liquid crystals;
Component B consists of one or more compounds selected from the group of compounds of formula I

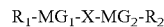
$R_1$-$MG_1$-$X$-$MG_2$-$R_2$   I;

Wherein,
$R_1$ and $R_2$ each independently denote —H, —F, —Cl, —CN, —NCS or a chain alkyl group with 1 to 25 C atoms where one or more H atoms may be independently substituted by halogen or CN and one or more nonadjacent —CH$_2$— may be independently replaced by —O—, —S—, —NH—, —N(CH$_3$)—, —CO—, —COO—, —OCO—, —OCOO—, —SCO—, —COS—, —CH=CH—, —CH=CF—, —CF=CF— or —C≡C— in such a manner that two —O— are not directly adjacent to one another,
$MG_1$ and $MG_2$ each independently denote a mesogenic group,
X is a straight-chain or branched alkyl group with 1, 3 or 5-40 C atoms where one or more nonadjacent —CH$_2$— may be independently replaced by —O—, —S—, —NH—, —N(CH$_3$)—, —CO—, —COO—, —OCO—, —OCOO—, —SCO—, —COS—, —CH=CH—, —CH=CF—, —CF=CF—, —C≡C— or —CH(CN)— in such a manner that no two —O— are adjacent to one another or no two groups selected from —OCO—, —SCO—, —OCOO—, —COS—, —COO— and —CH=CH— are adjacent to each other,
The optical anisotropy of the liquid crystal composition is greater than 0.14.

In some embodiments of the present invention, the component B is 1%-20% by weight of the liquid crystal composition.

In some embodiments of the present invention, the mesogenic group is selected from the group of formula II

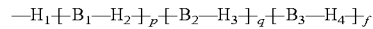
—H$_1$—[—B$_1$—H$_2$—]$_p$—[—B$_2$—H$_3$—]$_q$—[—B$_3$—H$_4$—]$_f$   II wherein,
$H_1$, $H_2$, $H_3$ and $H_4$ each independently denote a ring structure selected from the group of

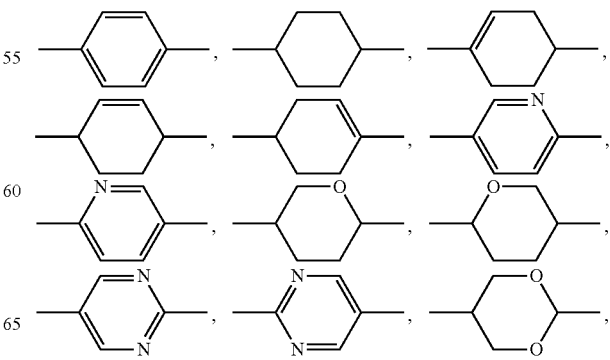

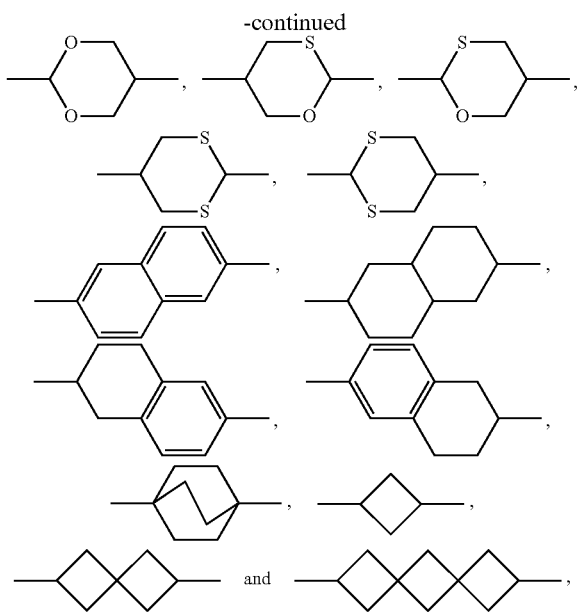

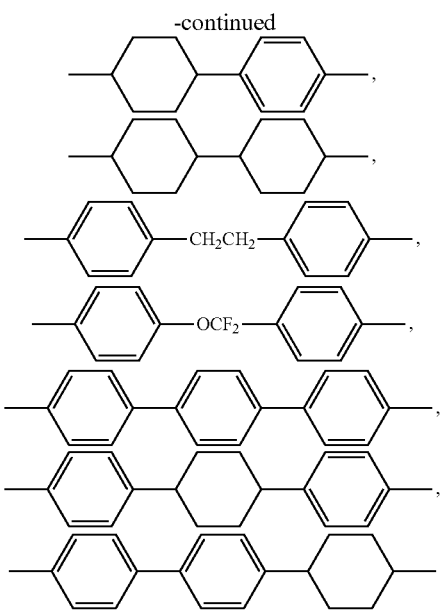

wherein 1-4 H atoms of the ring structures may be independently substituted by halogen, CN or a chain alkyl group with 1-7 C atoms where at least one —CH$_2$— may be replaced by —CHO—, —CO—, —COO— or —OCO— and at least one H atom may be substituted by F or Cl, B$_1$, B$_2$ and B$_3$ each independently denote —COO—, —OCO—, —OCOO—, —OCH$_2$—, —CH$_2$O—, —CF$_2$O—, —(CH$_2$)$_2$—, —(CH$_2$)$_4$—, —C≡C—, —CH=CH—, —CF$_2$CF$_2$—, —CF=CF—, —CH=CH—COO—, —OCO—CH=CH— or a single bond, p, q and r is 0 or 1.

In some preferred embodiments, the mesogenic group each independently comprises at least two six-membered rings. In a more preferred embodiment, the mesogenic group is each independently selected from the group of

and their mirror structures or enantiomers, wherein 1-4 H atoms of the six-membered ring may be independently substituted by halogen, CN or a chain alkyl group with 1-7 C atoms where one or more nonadjacent —CH$_2$— may be replaced by —CHO—, —CO—, —COO— or —OCO— and one or more H atoms may be substituted by F or Cl.

In some embodiments of the present invention, R$_1$ and R$_2$ each independently denote —F, —Cl, —CN, —OCF$_3$, —CF$_3$ or an unsubstituted chain alkyl group with 1-10 C atoms.

In some embodiments of the present invention, X is selected of formula III $$-Y_1-(CH_2)_s-Y_2- \quad\quad\quad III$$

wherein, Y$_1$ and Y$_2$ each independently denote —COO—, —OCO—, —O—, —CH=CH—, —CF$_2$O—, —OCF$_2$—, —CF$_2$CF$_2$— or a single bond, s is an odd number between 3-13.

In some preferred embodiments, Y$_1$ and Y$_2$ each independently denote —O— or a single bond.

In some preferred embodiments, the compound of formula I is selected from the group of compounds I-1 to I-26:

I-1

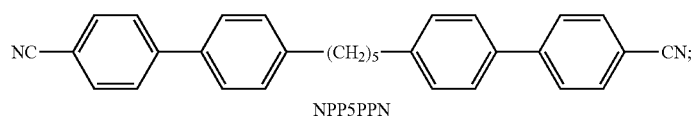

NPP5PPN

I-2

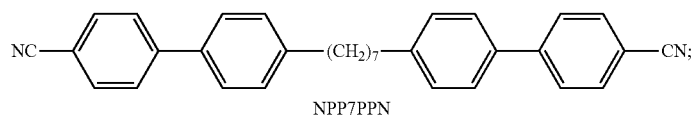

NPP7PPN

I-3

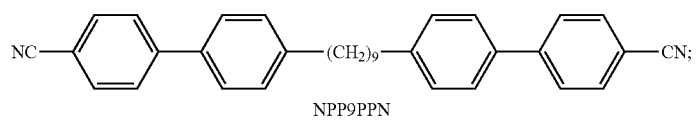

NPP9PPN

-continued
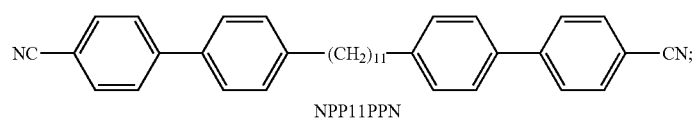
NPP11PPN
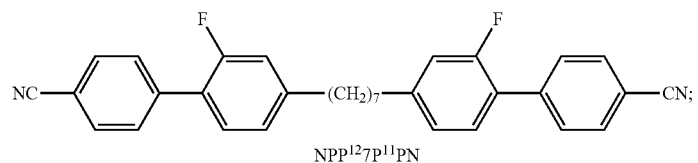
NPP$^{12}$7P$^{11}$PN
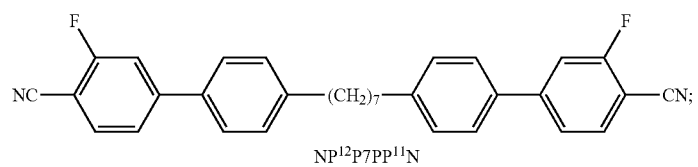
NP$^{12}$P7PP$^{11}$N
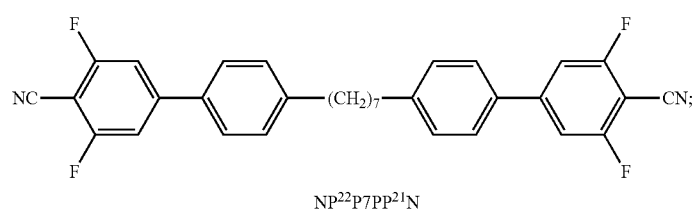
NP$^{22}$P7PP$^{21}$N
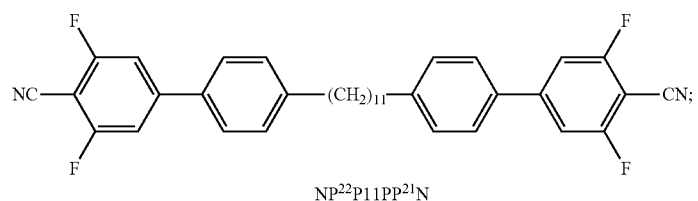
NP$^{22}$P11PP$^{21}$N
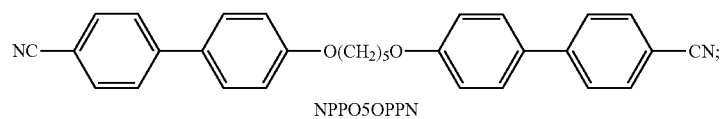
NPPO5OPPN
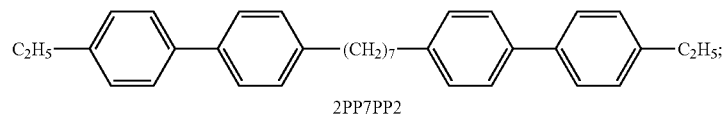
2PP7PP2
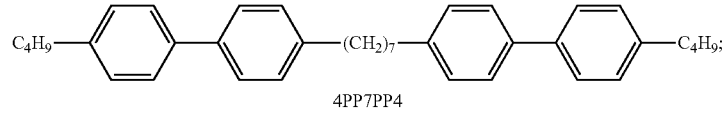
4PP7PP4
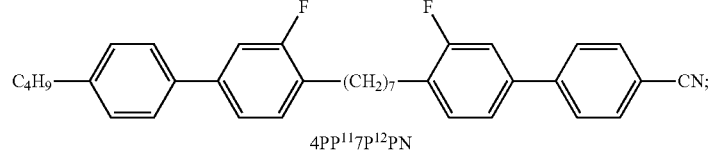
4PP$^{11}$7P$^{12}$PN
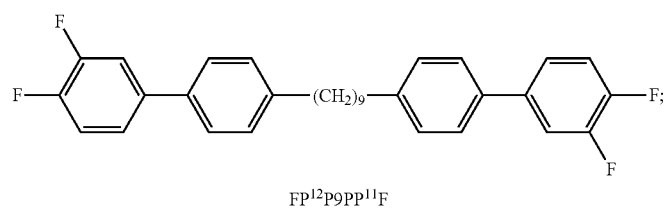
FP$^{12}$P9PP$^{11}$F -continued
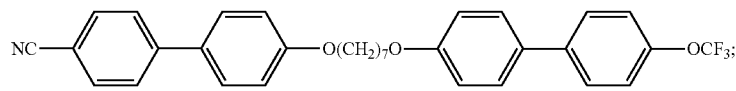
I-14
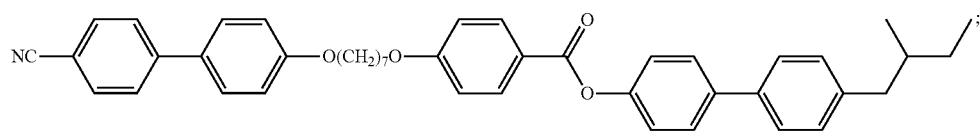
I-15
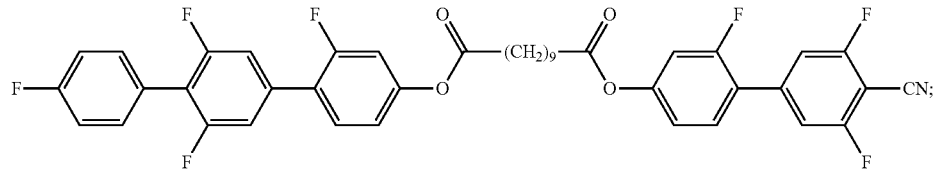
I-16
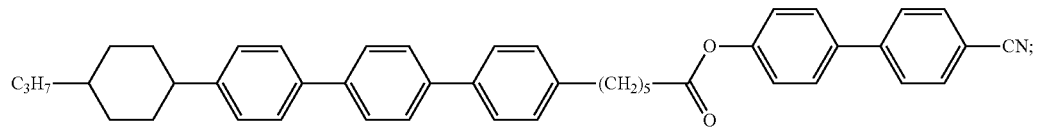
I-17
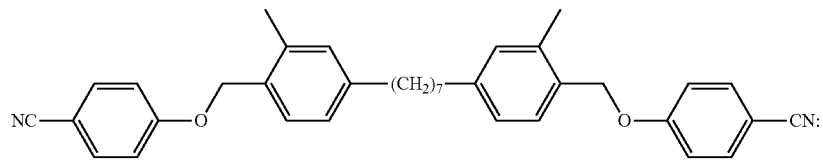
I-18
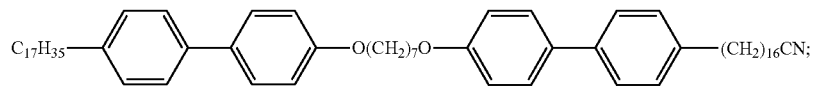
I-19
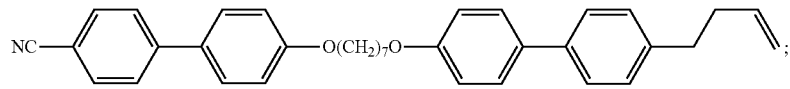
I-20
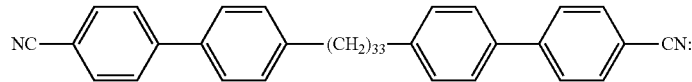
I-21
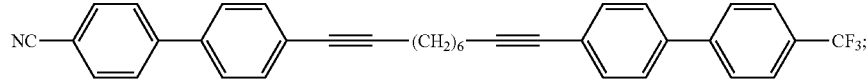
I-22
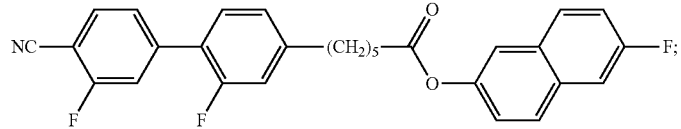
I-23
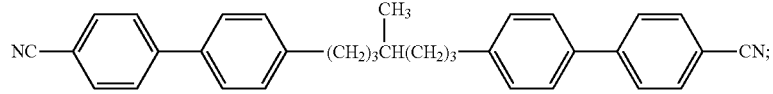
I-24
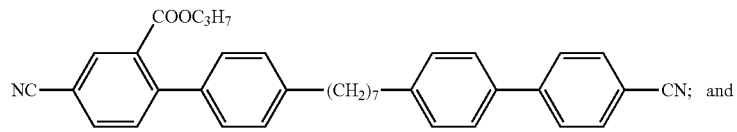
I-25

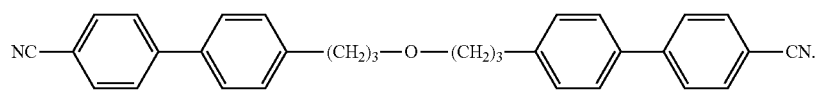

I-26

In some embodiments, the compound of formula I is further selected from the group of compounds I-1, I-3, I-4, I-6, I-9, I-11 and I-13.

In some embodiments, the liquid crystal composition further comprises one or more ionic compounds.

In some embodiments, the liquid crystal composition further comprises one or more dyes. In some preferred embodiments, the dye is a dichroic dye.

In some embodiments, the liquid crystal composition further comprises a light stabilizer and an UV inhibitor.

Another objective of the present invention is to provide a light modulating device containing the liquid crystal composition, the light modulating device comprises: an upper transparent substrate and a lower transparent substrate, wherein the inner surfaces of the upper transparent substrate and the lower transparent substrate are respectively provided with an upper transparent electrode and a lower transparent electrode, and a liquid crystal layer comprising the liquid crystal composition disposed between the upper transparent substrate and the lower transparent substrate. The light modulating device is in a transparent state when no voltage is applied, and is in a dark state when a voltage is applied.

The present invention provides a liquid crystal composition that can be used in light modulating devices. By introducing bimesogenic compounds into the negative liquid crystals or mixtures thereof to adjust the elastic constant of the liquid crystal system, resulting a complex liquid crystal structure that scatters light, thus further significantly reducing the light transmittance and increasing the haze in the dark state, thus broadening its scope of applications.

BRIEF DESCRIPTION OF THE DRAWINGS

The present invention can be better understood through the illustration of the following embodiments, wherein:

FIG. 1 illustrates the voltage-transmittance (V-T) curve of comparative example and Example 1.

DETAILED DESCRIPTION OF THE INVENTION

The following description of the disclosed embodiments is provided in detail to enable any person skilled in the art to fully understand the present invention. However, the present invention can be practiced without these specific details to those skilled in the art. In this regard, the description of the different illustrative exemplary embodiments presented herein are for the purpose of illustration and description and are not intended to be exhaustive or limited to the inventive concept. Accordingly, the scope of the invention is not to be limited by the specific embodiments described above, and is subject only to the scope of the appended claims.

Components used in following examples can be either synthesized using a known method or purchased from a commercial supplier. These synthetic methods are conventional and each of the obtained liquid crystal compounds should meet the standards for electronic compounds.

First, the present invention discloses a liquid crystal composition and a light modulating device thereof. The light modulating device comprises: an upper transparent substrate, a lower transparent substrate, wherein the inner surfaces of the upper transparent substrate and the lower transparent substrate are respectively provided with an upper transparent electrode and a lower transparent electrode, a liquid crystal layer containing the liquid crystal composition disposed between the upper transparent substrate and the lower transparent substrate. When no voltage is applied, the liquid crystal molecules in the liquid crystal layer are arranged perpendicular to the surface of the light modulating device and the incident light is substantially transmitted through the device, so that the device is in transparent state. When an external voltage is applied, the liquid crystal molecules are driven towards being parallel to the surface of the device, and the elastic property of the liquid crystal composition is such that the incident light is scattered forwards and backwards, furthermore, the light transmittance of the device is reduced, the device is in dark state and the haze is increased. The degree of incident light scattering is dependent on the amplitude of the applied electric field.

The liquid crystal composition comprises component A and component B. Component A consists of one or more negative liquid crystals. In the following examples, component A is selected from commercially available negative liquid crystal mixtures BHR 28100-400 (purchased from Beijing Bayi Space LCD Technology Co., Ltd.). Component B is a liquid crystal compound comprising two mesogenic groups, that is, two groups capable of inducing a liquid crystal phase. Due to the flexible chain between the two mesogenic groups, the whole liquid crystal compound forms a bended structure, thereby obtaining a relatively low bending elastic constant $K_{33}$. When the liquid crystal composition of the present invention is applied to a light modulating device, the liquid crystal molecules will not form a uniform director structure, but rather a complex domained structure when a voltage is applied, thereby causing the liquid crystals to scatter light and increase haze of the dark state. Meanwhile, under the same voltage and frequency, the minimum dark state transmittance of the light modulating device can be largely decreased and the haze of the dark state can be increased, thus broadening its scope of applications. Meanwhile, in order to achieve sufficient scattering of the light modulating device in the dark state and enable the haze of the dark state to meet requirement of privacy protection, the optical anisotropy Δn of the liquid crystal composition needs to be large enough. In the present invention, the optical anisotropy Δn of the liquid crystal composition is greater than 0.14, preferably greater than 0.20.

The liquid crystal composition may further include one or more ionic compounds. The ionic compound is a compound that can be dissolved in a liquid crystal composition and thus in an ionic state. the driving voltage of the light modulating device may be effectively reduced while improving the dark-state haze. In some embodiments, the ionic compound is organic ionic compound, the organic ionic compound includes one or more selected from amine compounds, alkyl sulfate compounds, alkyl phosphate compounds and alkyl iodate compounds. The amine compound includes one or more selected from (Ferrocenylmethyl) trimethylammonium iodide, Phenyltrimethylammonium iodide, Cetyltrimethylammonium bromide, Tetrabutylammonium bromide, Tetraoctadecylammonium bromide, 1-Butyl-3-methylimidazolium tetrachloroferrate, 1-Butyl-3-methylimidazolium-L-lactate, 1-Ethyl-3-methylimidazolium-L-lactate, Cetyltrimethylammonium perchlorate, Benzyldimethylhexadecylammonium chloride, Dodecylpyridinium bromide, Hexadecylpyridinium bromide, Cetylpyridinium chloride, Cetyltributylammonium bromide, Octadecyltributylammonium bromide, Octadecyltrimethylammonium bromide, Dodecyltrimethylammonium bromide and Cetyltrimethylammonium chloride. The weight ratio of the ionic compound is generally less than 2%.

The liquid crystal composition further comprises one or more dyes in order to add color to the light modulating device. Preferably, the dye is a dichroic dye, so that the device can further adjust the light transmittance, due to the light absorption of the dichroic dye. For example, when the 10V low voltage applies, the liquid crystal molecules along with the dye molecules rotate away from a vertical arrangement to a parallel arrangement, and, the dye molecules absorb part of the light to reduce the light transmission and darken the device. With the increase of voltage, the alignment of the liquid crystal molecules becomes non-uniform due to the influence of flexoelasticity of the liquid crystals, and the incident light is scattered, so that the light transmittance of the device continues to decrease and the haze increases. Meanwhile, with the different applied electric field, we can control the scattering degree of incident light, making the device appear in different dark states. The dye can be a commercially available dichroic dye, such as the black dye X12, black dye X13 and blue dye X15 produced by BASF, the dye is 0.1%-5% by weight of the liquid crystal composition.

The liquid crystal composition further comprises a light stabilizer and an UV inhibitor, so that it will reduce the material decomposition and aging risk typically caused by exposure to the UV light when the light modulating device containing the liquid crystal composition is used.

In the following examples, the group structures of the liquid crystal molecules are represented by the codes listed in Table 1.

TABLE 1

| the code for groups of liquid crystal | |
|---|---|
| Code | Group structure |
| H | (cyclohexyl) |
| O | —O— |
| P | (phenyl) |
| P[11] | (fluorophenyl, 1F) |
| P[12] | (fluorophenyl, 1F different position) |
| P[21] | (difluorophenyl, 2F) |
| P[22] | (difluorophenyl, 2F different position) |
| N | —C≡N |
| F | —F |
| n | $—C_nH_{2n+1}$ or $—C_nH_{2n}—$ | where, if n=3, the group is $—C_3H_7$ or $—C_3H_6—$

Generally, the liquid crystal composition was prepared in accordance with the mass ratio of each compound listed in the corresponding table of each example, and then the liquid crystal composition was filled into a liquid crystal light modulating substrate (liquid crystal cell) to determine its optical performance. The light transmittance is characterized by testing a conventional V-T curve (the test range 0-70V), the haze is measured by the haze meter WGT-S, and the optical anisotropy Δn is measured by the Abbe refractometer at 25° C. The composition of each liquid crystal composition and its performance parameter are shown in tables below.

Comparative Example

TABLE 2

| formula of liquid crystal composition, parameters of the liquid crystal cell and its performance data | | | |
|---|---|---|---|
| Component | Ratio/% | parameters of the liquid crystal cell and its performance data | |
| BHR28100-400 | 100 | Cell gap(μm) | 20 |
| | | Δn | 0.235 |
| | | Minimum light transmittance | 42.64% |
| | | Maximum haze | 78.80% |

Example 1

TABLE 3 formula of liquid crystal composition, parameters of the liquid crystal cell and its performance data

| Component | Ratio/% | parameters of the liquid crystal cell and its performance data | |
|---|---|---|---|
| BHR28100-400 | 97 | Cell gap(μm) | 20 |
| NPP7PPN | 3 | Δn | 0.232 |
| Total | 100 | Minimum light transmittance | 26.25% |
|  |  | Maximum haze | 91.56% |

Wherein, the voltage-transmittance (V-T) curve of comparative example and example 1 is shown in FIG. 1.

Example 2

TABLE 4 formula of liquid crystal composition, parameters of the liquid crystal cell and its performance data

| Component | Ratio/% | parameters of the liquid crystal cell and its performance data | |
|---|---|---|---|
| BHR28100-400 | 82 | Cell gap(μm) | 20 |
| NPP7PPN | 6 | Δn | 0.22 |
| NPP9PPN | 6 | Minimum light transmittance | 8.81% |
| NPP11PPN | 6 | Maximum haze | 94.15% |
| Total | 100 |  |  |

Example 3

TABLE 5 formula of liquid crystal composition, parameters of the liquid crystal cell and its performance data

| Component | Ratio/% | parameters of the liquid crystal cell and its performance data | |
|---|---|---|---|
| BHR28100-400 | 93 | Cell gap(μm) | 20 |
| NPP7PPN | 5 | Δn | 0.231 |
| 4PP7PP4 | 2 | Minimum light transmittance | 36.62% |
| Total | 100 | Maximum haze | 88.78% |

Example 4

TABLE 6 formula of liquid crystal composition, parameters of the liquid crystal cell and its performance data

| Component | Ratio/% | parameters of the liquid crystal cell and its performance data | |
|---|---|---|---|
| BHR28100-400 | 93 | Cell gap(μm) | 20 |
| NPP7PPN | 5 | Δn | 0.231 |
| FP$^{12}$P9PP$^{11}$F | 2 | Minimum light transmittance | 33.69% |
| Total | 100 | Maximum haze | 89.54% |

Example 5

TABLE 7 formula of liquid crystal composition, parameters of the liquid crystal cell and its performance data

| Component | Ratio/% | parameters of the liquid crystal cell and its performance data | |
|---|---|---|---|
| BHR28100-400 | 93 | Cell gap(μm) | 20 |
| NPP7PPN | 5 | Δn | 0.231 |
| NP$^{12}$P7PP$^{11}$N | 2 | Minimum light transmittance | 29.52% |
| Total | 100 | Maximum haze | 90.48% |

Example 6

TABLE 8 formula of liquid crystal composition, parameters of the liquid crystal cell and its performance data

| Component | Ratio/% | parameters of the liquid crystal cell and its performance data | |
|---|---|---|---|
| BHR28100-400 | 89.99 | Cell gap(μm) | 20 |
| NPP7PPN | 4 | Δn | 0.228 |
| NPP9PPN | 3 | Minimum light transmittance | 6.02% |
| NPP11PPN | 3 |  |  |
| Cetyltrimethylammonium chloride | 0.01 | Maximum haze | 94.26% |
| Total | 100 |  |  |

Example 7

TABLE 9 formula of liquid crystal composition, parameters of the liquid crystal cell and its performance data

| Component | Ratio/% | parameters of the liquid crystal cell and its performance data | |
|---|---|---|---|
| BHR28100-400 | 87.57 | Cell gap(μm) | 20 |
| NPP7PPN | 3.89 | Δn | 0.228 |
| NPP9PPN | 2.92 | Minimum light transmittance | 3.46% |
| NPP11PPN | 2.92 | Maximum haze | 82.17% |
| Black dye X12 | 2.7 |  |  |
| Total | 100 |  |  |

Example 8

TABLE 10 formula of liquid crystal composition, parameters of the liquid crystal cell and its performance data

| Component | Ratio/% | parameters of the liquid crystal cell and its performance data | |
|---|---|---|---|
| BHR28100-400 | 84.59 | Cell gap(μm) | 20 |
| NPP7PPN | 4.97 | Δn | 0.224 |

TABLE 10-continued formula of liquid crystal composition,
parameters of the liquid crystal cell and its performance data

| Component | Ratio/% | parameters of the liquid crystal cell and its performance data | |
|---|---|---|---|
| NPP9PPN | 4.97 | Minimum light transmittance | 4.95% |
| NPP11PPN | 4.97 | Maximum haze | 90.01 |
| Black dye X12 | 0.5 | | |
| Total | 100 | | |

Example 9

TABLE 11 formula of liquid crystal composition,
parameters of the liquid crystal cell and its performance data

| Component | Ratio/% | parameters of the liquid crystal cell and its performance data | |
|---|---|---|---|
| BHR28100-400 | 84.8 | Cell gap(μm) | 20 |
| NPP7PPN | 5 | Δn | 0.224 |
| NPP9PPN | 5 | Minimum light transmittance | 33.74% |
| NPP11PPN | 5 | Maximum haze | 90.67% |
| NPPO5OPPN | 0.2 | | |
| Total | 100 | | |

From the above examples and comparative example, it is demonstrated that the light modulating device containing the liquid crystal composition of the present invention has a significantly reduced minimum dark state light transmittance and increased haze, therefore, the tuning range of the light transmittance of the light modulating device is increased, broadening the field of the application for the devices.

While several specific exemplary embodiments have been described above in detail, the disclosed embodiments are considered illustrative rather than limiting. Those skilled in the art will readily realize that alternatives, modifications, variations, improvements, and substantial equivalents are possible without substantially departing from the novelty spirits or scope of the present disclosure. Thus, all such alternatives, modifications, variations, improvements, and substantial equivalents are intended to be embraced within the scope of the present disclosure as defined by the appended claims.

INDUSTRIAL APPLICABILITY

The liquid crystal composition and the light modulating devices using the same can be applied to the field of liquid crystals.

The invention claimed is:

1. A liquid crystal composition, comprising:
Component A consists of one or more negative liquid crystal components;
Component B consists of one or more compounds selected from the group of compounds of formula I; and
Component C consists of one or more ionic compounds;

$$R_1\text{-}MG_1\text{-}X\text{-}MG_2\text{-}R_2 \qquad I;$$

wherein, $R_1$ and $R_2$ each independently denote —H, —F, —Cl, —CN, —NCS or a chain alkyl group with 1 to 25 C atoms where one or more H atoms may be independently substituted by halogen or CN and one or more nonadjacent —CH$_2$— may be independently replaced by —O—, —S—, —NH—, —N(CH$_3$)—, —CO—, —COO—, —OCO—, —OCOO—, —SCO—, —COS—, —CH=CH—, —CH=CF—, —CF=CF— or —C≡C— in such a manner that two —O— are not directly adjacent to one another, MG$_1$ and MG$_2$ each independently denote a mesogenic group, X is a straight-chain alkyl group with 1, 3 or 5-40 C atoms or a branched alkyl group with 3 or 5-40 C atoms where one or more nonadjacent —CH$_2$— may be independently replaced by —O—, —S—, —NH—, —N(CH$_3$)—, —CO—, —COO—, —OCO—, —OCOO—, —SCO—, —COS—, —CH=CH—, —CH=CF—, —CF=CF—, —C≡C— or —CH(CN)— in such a manner that no two —O— are adjacent to one another or no two groups selected from —OCO—, —SCO—, —OCOO—, —COS—, —COO— and —CH=CH— are adjacent to each other, the optical anisotropy of the liquid crystal composition is greater than 0.14.

2. The liquid crystal composition of claim 1, wherein mesogenic group is selected from the group of formula II

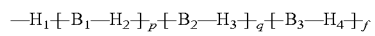

wherein, $H_1$, $H_2$, $H_3$ and $H_4$ each independently denote a ring structure selected from the group of

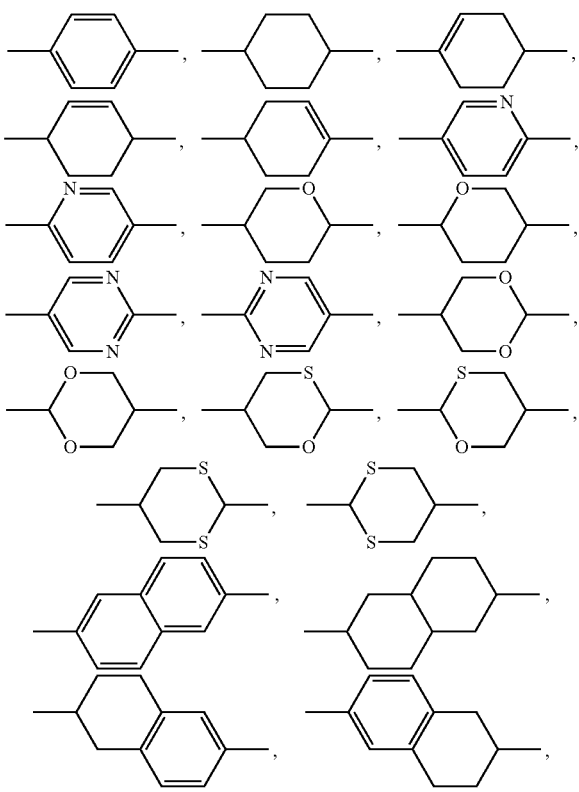

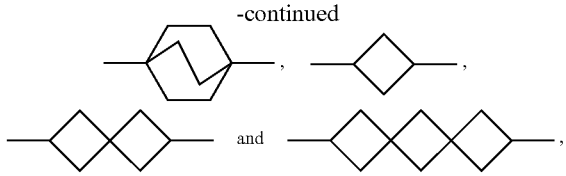

wherein 1-4 H atoms of the ring structures may be independently substituted by halogen, CN or a chain alkyl group with 1-7 C atoms where at least one —CH$_2$— may be replaced by —CHO—, —CO—, —COO— or —OCO— and at least one H atom may be substituted by F or Cl, B$_1$, B$_2$ and B$_3$ each independently denote -COO—, —OCO—, —OCOO—, —OCH$_2$—, —CH$_2$O—, —CF$_2$O—, —(CH$_2$)$_2$—, —(CH$_2$)$_4$—, —C≡C—, —CH═CH—, —CF$_2$CF$_2$—, —CF═CF—, —CH═CH—COO—, —OCO—CH═CH— or a single bond, p, q and r is 0 or 1.

3. The liquid crystal composition of claim 2, wherein the mesogenic group each independently comprises at least two six-membered rings.

4. The liquid crystal composition of claim 3, wherein the mesogenic group is each independently selected from the group of

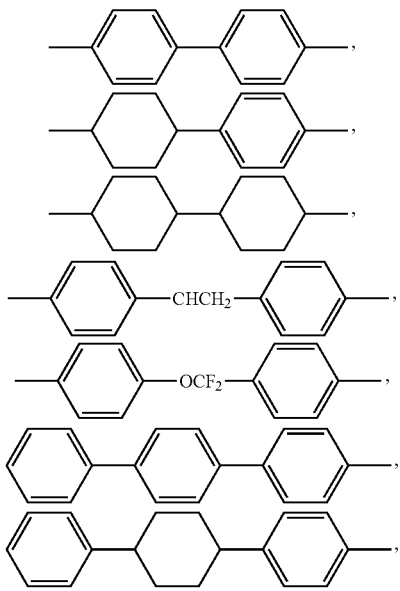

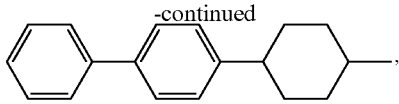

and their mirror structures, wherein 1-4 H atoms of the six-membered ring may be independently substituted by halogen, CN or a chain alkyl group with 1-7 C atoms where one or more nonadjacent —CH$_2$— may be replaced by —CHO—, —CO—, —COO— or —OCO— and one or more H atoms may be substituted by F or Cl.

5. The liquid crystal composition of claim 1, wherein R$_1$ and R$_2$ each independently denote —F, —Cl, —CN, —OCF$_3$, —CF$_3$ or an unsubstituted chain alkyl group with 1-10 C atoms.

6. The liquid crystal composition of claim 1, wherein X is selected of formula III $$—Y_1—(CH_2)_s—Y_2— \quad\quad III$$

wherein, Y$_1$ and Y$_2$ each independently denote —COO—, —OCO—, —O—, —CH═CH—, —CF$_2$O—, —OCF$_2$—, —CF$_2$CF$_2$— or a single bond, and s is an odd number between 3 and 13.

7. The liquid crystal composition of claim 1, wherein the liquid crystal composition further comprises one or more dyes.

8. The liquid crystal composition of claim 7, wherein the dye is a dichroic dye.

9. The liquid crystal composition of claim 1, wherein the liquid crystal composition further comprises a light stabilizer and an UV inhibitor.

10. The liquid crystal composition of claim 1, wherein the component B is 1%-20% by weight of the liquid crystal composition.

11. A light modulating device comprising the liquid crystal composition of claim 1, and further comprising:
an upper transparent substrate and a lower transparent substrate, wherein the inner surfaces of the upper transparent substrate and the lower transparent substrate are respectively provided with an upper transparent electrode and a lower transparent electrode; and
a liquid crystal layer disposed between the upper transparent substrate and the lower transparent substrate, which contains the liquid crystal composition;
wherein, the light modulating device is in a transparent state when no voltage is applied, and is in a dark state when a voltage is applied.

\* \* \* \* \*